Jan. 5, 1954  R. NICHOLSON  2,664,741
MORTAR FORM
Filed April 20, 1948  3 Sheets-Sheet 1

INVENTOR
Roderick Nicholson
BY
Emery, Varney, Whittemore & Dix
ATTORNEYS

Jan. 5, 1954  R. NICHOLSON  2,664,741
MORTAR FORM
Filed April 20, 1948  3 Sheets-Sheet 2

INVENTOR
Roderick Nicholson
BY
Emery, Varney, Whittemore + Dix
ATTORNEYS

Jan. 5, 1954  R. NICHOLSON  2,664,741
MORTAR FORM

Filed April 20, 1948  3 Sheets-Sheet 3

INVENTOR
Roderick Nicholson
BY
Emery, Varney, Whittemore, & Dix
ATTORNEYS

Patented Jan. 5, 1954

2,664,741

UNITED STATES PATENT OFFICE 2,664,741

MORTAR FORM

Roderick Nicholson, Huntington, N. Y.

Application April 20, 1948, Serial No. 22,059

3 Claims. (Cl. 72—128)

This invention relates to a simple and efficient type of a building form, whereby a definite and satisfactory amount of cement or mortar may be quickly and accurately placed onto building blocks, bricks, stone and the like, for constructing a wall of a building, or a boundary wall, or for other purposes where blocks, brick or stone are positioned on top of each other.

The invention further pertains to an efficient type of building form that functions to save mortar or cement when laying up building blocks, bricks, or stones, by being so formed that it will receive only a definite quantity of the mortar or cement and will require that this definite quantity be placed where it functions for its desirable purposes of sticking and holding the building blocks, bricks or stones together and for creating a weatherproofing seal between the blocks, bricks or stones.

More in particular, this improved invention also provides a novel building form that functions to have mortar or cement, or the like, placed in a definite position on a building block without having the mortar spilled on to other parts of the block where it is not wanted and does not serve a useful purpose.

One of the particular features of this invention is to provide a series of portable building forms which are light and which are easily handled and which may be distributed around a building to thereby be readily available at any place on a building for positioning against a building block or brick or stone so that mortar or cement may be quickly placed on the building form to fill any openings or channels therein and then to scrape off excess amount of mortar or cement back into the supply container therefor. Thus, there is provided a predetermined definite amount of mortar or cement for engagement with predetermined areas of the block. It will be noted that this type of operation provides a very efficient time saving type of apparatus to be used in the erection of buildings or partition walls or for other uses.

A further feature of this invention is the provision of a novel structure of building form which is easy to handle and which receives the mortar or cement without due attention to particular placing of the mortar or cement on the block so long as it fills openings or channels in the building form.

Further features and advantages will be noted when reading the detailed description given below, and which description is to be taken in connection with the drawings herewith. In these drawings.

Figure 6:
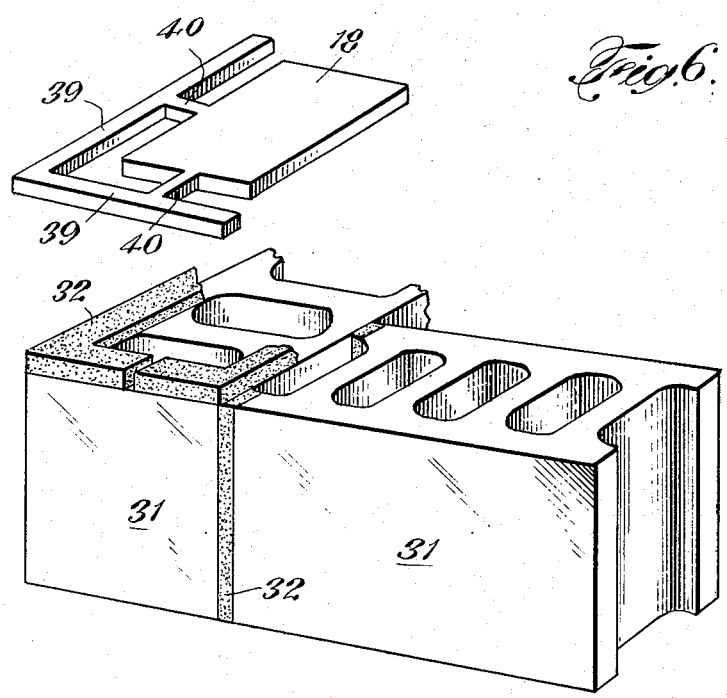
Figure 7:
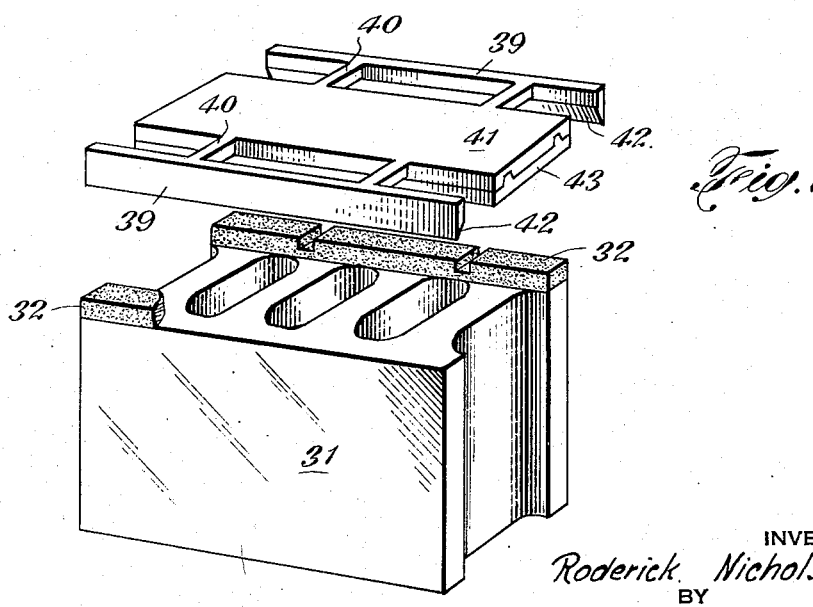

Fig. 6 is a perspective exploded view of a building form and two building blocks positioned to form a corner, the positioning of the mortar being shown at such a corner; and Fig. 7 is an exploded perspective view of a modified structure of a building form for providing the top edges of a building block with a predetermined amount of mortar, part of the building form being shown with a shim to change its thickness.

Figure 1:
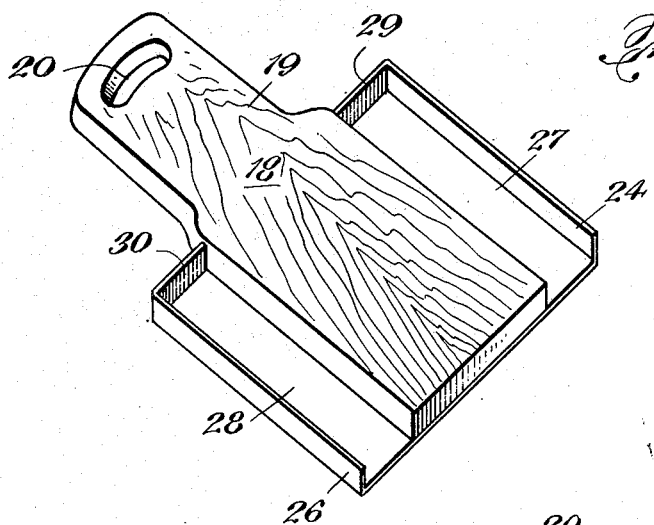
Fig. 1 is a perspective view of one structure of building form.

Referring now to these drawings, Fig. 1 illustrates a building form composed of a body or second portion 18 provided with a suitable type of handle or handle portion 19 which may be grasped along its edges or gripped with the fingers passing through opening 20.

The reverse side of the body 18 has a plate 21 fastened thereto in any suitable manner, and has its edges extending to form wings 22 and 23 which have their ends bent to form flanges 24 and 26, thereby forming one type of channels 27 and 28. Other types of channels may be formed as desired, such for instance, those of semicircular in cross section. In Figs. 1 to 4, inclusive, the upper ends of the channels 27 and 28 are closed by flanges 29 and 30. If desired, these flanges 29 and 30 may be done away with and when this building form is positioned against building block 31, as noted in Fig. 4, the mortar or concrete may be pushed down into channels 27 and 28.

Figure 3:
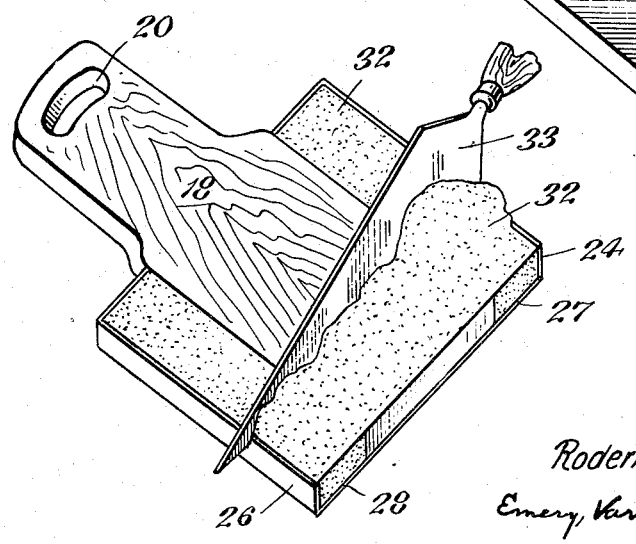
Fig. 3 illustrates a structure of Fig. 1 having been filled with mortar or cement and the latter being scraped off.

In Fig. 3 there is illustrated one of the reasons these particular building forms are of great advantage as the mortar or concrete 32 may be shoveled on to the form 18 without any particular regard to where the concrete lands except that it fills channels 27 and 28. After casually placing the concrete on the form 18, trowel 33 may be moved down across body 18 and scrape off excess mortar 32 back into the mortar container and thereby save the excess mortar, and at the same time a definite thickness of mortar within the channels 27 and 28 will be provided. The form 18 may now be quickly positioned against block 31 and the form raised, leaving the mortar 32 of definite thickness against predetermined areas of the block 31. The next adjoining block may be quickly positioned against the mortar 32 and thereby be held in definite position by the adhering mortar which is thick enough to hold the blocks in position and which creates a weatherproofing seal between the blocks.

Figure 2:
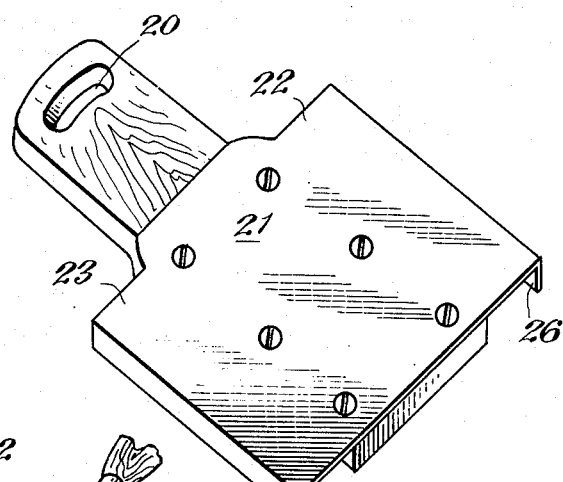
Fig. 2 is a perspective view of the reverse side of the building form shown in Fig. 1.

It will be noted from inspection of Figs. 1, 2 and 3 that there is a balance of the size of the body, its length, and the sizes of the handle, the plate and its wing extensions beyond the body, and the height of the wing flanges. The thickness of the body 18 is approximately one inch, and the plate 22 extends along the body from one end thereof for at least two-thirds of the total length of the building form, see particularly Figs. 1 and 2. This plate 22 also extends sidewise beyond the sides of the body for forming the wings which terminate in the upright flanges 24, 26, 29 and 30 thus forming channels 27 and 28 with the body. Each channel 27 and 28, as shown in Figs. 1 and 3, may be said to approximate in width a percentage of the width of the body 18, and, as shown, each channel is a little less than one-half the width of the body 18. Flanges 29 and 30 are at the top edges of the channels and are the edges nearest the handle. Also, it will be noted that the top flanges 29 and 30 are of approximately the same height as the thickness of the body 18.

In constructing this simple and efficient building form, it will be noted that a very great saving of time and of material will be accomplished as well as providing definite desirable thicknesses of the mortar or cement on predetermined areas of the building blocks, bricks or stones. Constructions of other types of the building forms may be provided so long as they perform the desired functions.

Figure 4:
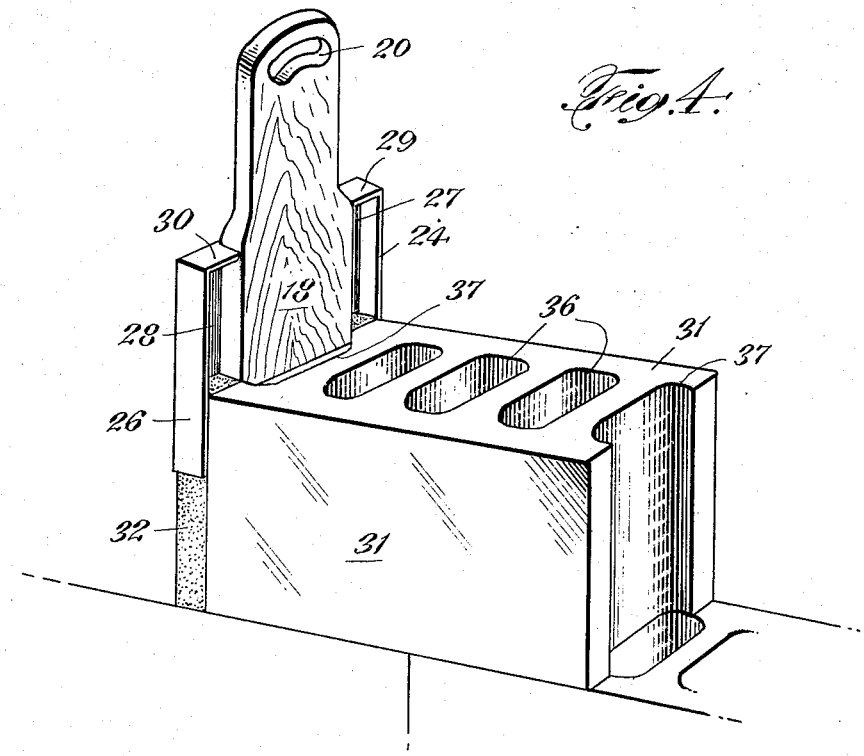
Fig. 4 illustrates the form in Figs. 1 to 3 in its engagement with one end of the well known types of building blocks and has a raised body portion to fit in the opening of a half-end of one of these blocks.

A preferred type of building block 31 has been provided in the building industry as being satisfactory for strength, for saving of materials and for providing various air pockets which act as insulation against flow of heat. Such a type of block is shown as block 31 in Fig. 4. This block is provided with openings 36 which preferably pass entirely through the block. At the end of the blocks there are half-openings 37. In Fig. 4 a modified form of body 18 is shown wherein this body portion will engage the side edges of opening 37 and be slightly higher than the top edges of flanges 24 and 26, thus making it exceptionally easy for the builder to position the building form in the position for which it is constructed and will prevent sidewise relative movement between the form and the block. Other constructional changes may be made in this particular type of building form 18.

Figure 5:
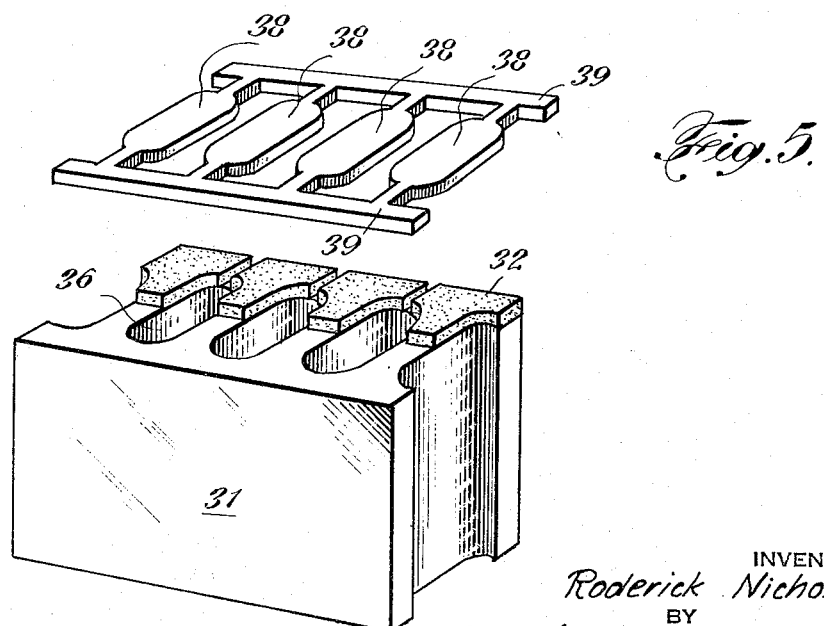
Fig. 5 is a perspective view of a modified structure of building form and a building block against which it has been placed for the reception of mortar or cement, and this figure illustrates only a portion of the mortar covering predetermined areas of a building block.

Referring now to Fig. 5, another modified structure of building form is provided by having central bodies 38 connected by strips 39. This building form engages the top of block 31 by having bodies 38 extend down into openings 36, thereby positioning the building form. In this modified structure of building form, the mortar or concrete may be thrown on to the form and a scraper passed across the top edges of body 38 and strips 39, thereby providing concrete layer 32 of substantially uniform thickness as partially shown in the lower part of Fig. 5.

Referring now to Fig. 6, a modified structure of building form is shown for the purpose of placing concrete on the blocks which form the corners of a wall. This form is constituted by a body 18 having joined strips 39 to form openings or channels in which concrete may be thrown and then scraped off by a stick or trowel or other suitable building product, thereby leaving the concrete 32 on the block 31 in the desired position as shown in this Fig. 6.

In this end building form any suitable number of joining supports 40 may be employed for the purpose of holding the strips 39 firmly to the body 18.

Another suitable modified structure of building form is shown in Fig. 7, wherein the single body 41 covers the three openings 36 and also provides strips 39 and supports 40, thereby to form channels for receiving the mortar or cement. In the preferred structure shown in Fig. 7, the building form has been shown of a little larger width than the building block 31 and the lower inside end edges 42 of the strips 39 have been beveled so that they will engage the top corner edges of the block. This type of structure of strip assists in properly positioning the building form on the block. Also in this type of structure of building form, a shim 43 has been provided so as to raise up the body portion 41 to any desired extent, thereby to determine the thickness of concrete 32 to be placed on the top of the building block 31. While the preferred shim 43 is employed for raising the building form, it will be understood that blocks or strips may be employed to accomplish the same result.

With this type of improved building form shown in Fig. 7, it has been found that this portable form is easily and quickly applied and properly positioned on the building block and the mortar or cement placed or thrown in the channels without accuracy and then a scraper passed over the body and strips 39 removing the excess quantity of mortar or cement. The building form is then quickly and easily removed, leaving the preferred thickness of mortar 32 on the desired areas of the building block.

In the description herein the words "building block" have been used as a primary name but it will be understood that they may mean bricks, stones or other supporting types of elements whether of cinder blocks, or ordinary brick, or ordinary stone, or other supporting materials, such, for instance, as glass, plastics, hard rubber or other similar material which are formed and have supporting strength.

It will also be understood that in the use of the word "body" that it will include one or several divided sections of the body forming the building form. Also, the word "plate" has been employed herein for suitable attachment to the body. It will be understood that the plate may be attached in any desirable manner to the body in any desired position and bent so as to form one or more varied channels or openings for receiving the mortar or cement and allowing the excess mortar or cement to be quickly scraped from the building form, thereby obtaining a substantially uniform thickness of mortar or cement on a particular or predetermined area of building block, brick or stone.

The improved building form may be constructed of any desired material, such as wood, or metal or of a hard plastic or other types of material so long as there is good strength in the building form.

It will be noted from the foregoing description that a very simple and efficiently functioning building form structure has been provided with several modifications for particular uses. It will further be noted that the improved building form is portable and may be made in quantity so that they are always within handy reach of the builder or mason. These building forms may be made in different sizes as desired.

It will further be noted that the building form operates to save a considerable amount of mortar or cement and that it provides definite thicknesses of the mortar or cement on predetermined areas of the building blocks, bricks, stones, or the like, to thereby bind the building blocks and the like, together in definite positions, and to form waterproofing seals between the blocks, bricks, and the like. Thus, the improved, light weight, building form may be employed at any place on the building for the purpose of obtaining good efficiency and for saving of a very large amount of mortar or cement, as well as saving a great deal of time of the builder.

It will be understood that various modifications and changes may be made in the preferred form of the invention herein, and such modifications and changes are to be understood as part of this invention, as outlined in the following claims.

The invention claimed is:

1. In a building form for positioning mortar on predetermined areas of a building block, the combination of a body being longer than wide and of rectangular cross section approximately one inch thick, said body having a handle thereon, a plate fastened to one of the larger surfaces of said body and extending outwardly sidewise beyond said body, said plate extending along the length of said body to approximately the point of the beginning of said handle, upstanding flanges of equal heights and of approximately the thickness of said body, said flanges being formed on the outer edges and on the free edges of said plate near said handle thereby forming open ended channels along the sides of said body whereby said body with its channels filled with mortar can be placed flush against said predetermined areas of the building block and thereafter withdrawn in a direction parallel to the surfaces which the mortar engages leaving layers of mortar on the predetermined areas of said block.

2. In a building form for positioning mortar on predetermined areas of a building block, the combination of a body rectangular in cross-section and rectangular in plan and having one of its flat larger surfaces free for contacting an area of a building block, a handle at one end of said body, and a plate connected to the surface of said body opposite said free surface for a partial length thereof, said plate extending laterally from said body on each side thereof, said plate having upstanding flanges at its free edges adjacent said handle and on its side edges thereof for heights substantially equal to the thickness of said body thereby forming channels along the sides of said body, whereby said channels when filled with mortar to the heights of said body and said flanges and placed flush against a surface of the building block and withdrawn therefrom in a direction parallel to the surface engaged leaves substantially uniform thickness of mortar on predetermined areas of said block.

3. In a building form for positioning mortar on predetermined areas of a building block, the combination of a body rectangular in cross-section and rectangular in plan and having one of its flat larger surfaces free for contacting an area of a building block, a handle formed at one end of said body in line with the longer axis of said body and a plate joined to the surface of said body which is opposite said free surface, said plate extending along said body from one end thereof approximately for two-thirds of the total length of said body and said handle, said plate extending laterally of said body, upstanding flanges of substantially equal heights formed on the outer edges and on the free top edges of said plate nearest said handle thereby forming with said body an open ended channel along each side of said body for discharging mortar placed in said channels when said form has been placed against predetermined areas of said block and is withdrawn in a direction opposite said open ends of said channels.

RODERICK NICHOLSON.

References Cited in the file of this patent

UNITED STATES PATENTS

| Number | Name | Date |
|---|---|---|
| 1,321,532 | Mann | Nov. 11, 1919 |
| 1,423,316 | Giovagnoli | July 18, 1922 |
| 2,094,703 | Hitzman | Oct. 5, 1937 |
| 2,462,644 | Kimura | Feb. 22, 1949 |

FOREIGN PATENTS

| Number | Country | Date |
|---|---|---|
| 43,012 | Sweden | Aug. 29, 1917 |